H. B. ANDERSON & P. ECKERT.
AUTOMOBILE LOCK.
APPLICATION FILED DEC. 1, 1909.

1,120,117.

Patented Dec. 8, 1914.

Witnesses
C. P. Wright Jr.
S. S. Bulket

Inventors
Harold B. Anderson,
Paul Eckert,
By A. S. Pattison
Attorney

UNITED STATES PATENT OFFICE.

HAROLD B. ANDERSON, OF CLEVELAND, AND PAUL ECKERT, OF CONNEAUT, OHIO.

AUTOMOBILE-LOCK.

1,120,117.   Specification of Letters Patent.   Patented Dec. 8, 1914.

Application filed December 1, 1909. Serial No. 530,828.

*To all whom it may concern:*

Be it known that we, HAROLD B. ANDERSON, residing at Cleveland, in the county of Cuyahoga and State of Ohio, and PAUL ECKERT, residing at Conneaut, in the county of Ashtabula and State of Ohio, citizens of the United States, have invented certain new and useful Improvements in Automobile-Locks, of which the following is a specification, reference being had therein to the accompanying drawing.

This invention relates to improvements in automobile locks, the object of which is to provide a detachable lock adapted for use with the controlling levers of a modern automobile, whereby the levers can be locked in such position as to prevent the using of an automobile until the lock is released.

Figure 1:
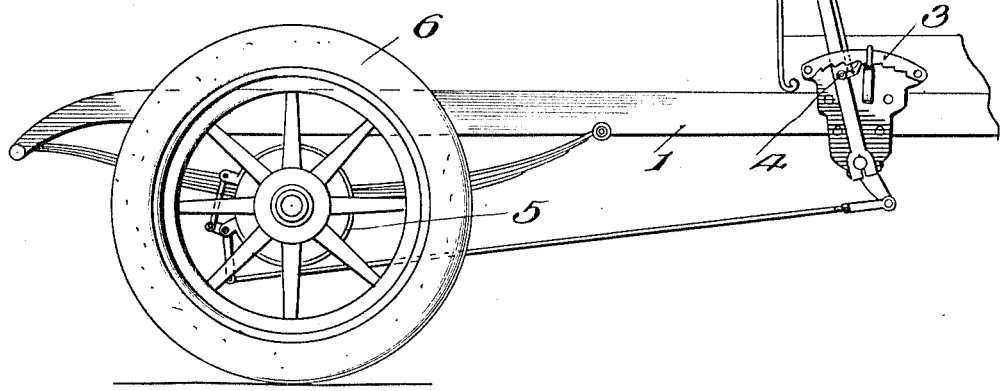
Figure 2:
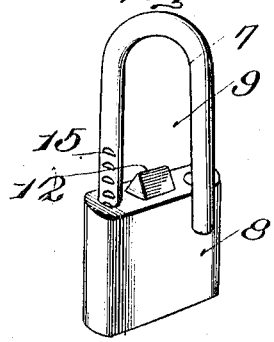
Figure 3:
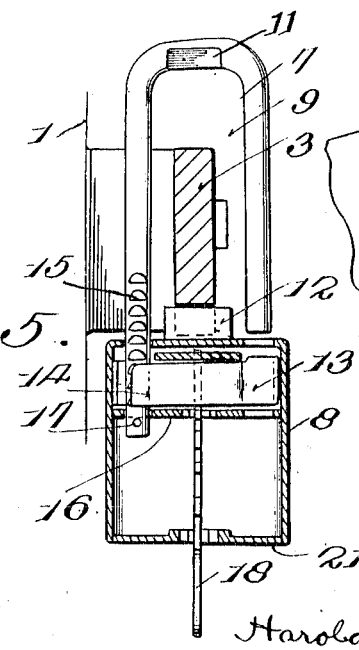
Figure 4:
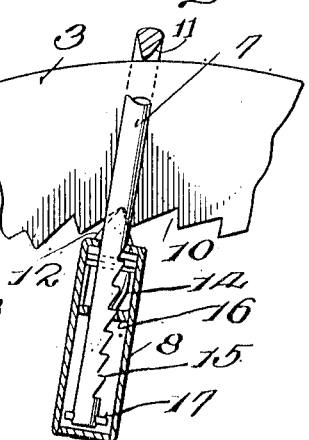
Figure 5:
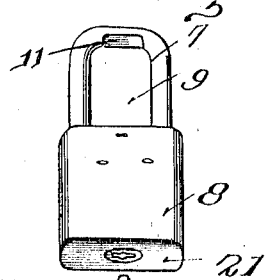

In the accompanying drawing—Figure 1 is a side elevation of a portion of an automobile showing the controlling lever and its notched segment with which this improved lock is to be used. Fig. 2 is a detached perspective view of the preferred form of lock. Fig. 3 is a sectional view through the lock showing it in the act of being applied. Fig. 4 is a sectional view of a lock showing it in its locked position on the notched segment. Fig. 5 is a detached perspective view of a modified form of the lock.

As is well known in the modern automobile, a controlling lever and a notched segment co-acting with the lever to hold it in its adjusted position are almost universally used. It is also well known and understood by those skilled in this art that the lever having the co-acting notched segment is the lever which controls a brake, and that this brake in most instances is termed the emergency brake, and it is used for locking the machine when it is left standing. It is also well known to those skilled in this art that in some instances this lever controls only the brake, whereas in the majority of constructions the lever not only applies the brake but in the act of applying the brake releases the propelling clutch so that the brake cannot be applied without releasing the clutch and thus throwing the engine out of operative communication with the driving mechanism. The reason for this is to prevent the strain on the driving mechanism when the brake is applied, and furthermore to relieve the vehicle of any driving force or momentum from the engine when the brake is applied.

This improvement consists in applying a lock in such relation to the controlling lever and the segment that the controlling lever is held in its locking position. Furthermore the improvement consists in so constructing the lock that it is adapted for use with all classes of automobiles having this construction by making the lock adjustable and thus adapted to co-act with segments of different widths.

Referring now particularly to the accompanying drawing, 1 is an automobile and 2 the controlling lever, and 3 the notched segment co-acting with a latch or detent 4, carried by a lever for locking the lever in its applied position. We have here shown the lever 2 connected with a hub brake 5 of the driving wheel 6. The mechanism is not here shown for connecting the lever to the clutch for throwing the clutch out when the brake is applied, but this is readily understood by those skilled in the art and a detailed illustration and a description thereof is unnecessary for a full understanding of the present invention. The segment 3 is here shown with the notches on the under edge. In some instances, however, these notches are formed on the upper edge of the segment. The present improvement, however, is adapted to be used with either form of segment, as will presently appear. The broad idea here involved is the coöperation with the notched segment and the controlling lever 2 of a lock adapted to interlock with the notches of the segment in such relation to the controlling lever that the controlling lever cannot be moved to its releasing position.

The form of lock here shown is of the padlock type with a U-shaped member 7. This U-shaped member 7 is adapted to be moved adjustably into the body 8 of the lock for the purpose of varying the size of the opening 9, between the U-shaped member 7 and the body 8. This adjustable feature permits the lock to be applied to segments of various widths, as will be readily understood. Furthermore, the lock is so constructed that the U-shaped member will be locked against its upward movement in its various adjustments after the U-shaped member 7 has been caused to embrace the segment 3, as shown in Fig. 3, and moved to the proper locked adjustment, as shown in Fig. 4. The member 7 furthermore is adapted to be turned laterally, to enable the U-shaped member 7 to be placed over the segment 3 after which the body 8 of the lock will be turned into the position shown in Fig. 3, and the member 7 then forced inward until it engages the opposite edges of the segment 3 and interlocks with the teeth 10 thereof, so that it cannot be moved longitudinally upon the segment.

It is essential that some portion of the lock should interlock with the teeth 10 of the segment 3, and this may be accomplished in various ways, any one of which will involve the broad idea of the present invention. That is to say, the member 7 can be made of such size that it will interlock with the teeth 10, and in this instance, the lock will be applied to the segment 3 in the reversed position from that here shown, that is to say the body-portion 8 will be placed uppermost so that the member 7 will interlock with the teeth. Preferably, however, either the member 7 or the body 8, or both, are provided with pointed or tapered portions 11 and 12, so that the lock can always be applied as shown in Figs. 1, 3 and 4, irrespective of the location of the teeth 10 on the segment 3, as will be readily understood.

The broad idea of this invention does not depend upon the specific form of the locking mechanism, but the preferred form of locking mechanism is that here shown and it consists in having a spring locking member 13, the free end 14 of which is adapted to engage the notches 15 on the long-arm of the U-shaped member 7. The inner end of the long-arm of the U-shaped member 7, passes through the body 8 of the lock and also through a wall 16, located within the body 8 and carries a pin or projection 17 to prevent its separation from the body 8. This wall 16 also serves the function of controlling the form of key to be used. This key 18 is provided with notches 19 in its edges, and these notches must be so located that when the key is inserted they will mesh with the end wall 21 of the body 8, and with the wall 16, to permit the key to be turned for forcing the free end 14 of the locking member 13 out of engagement with the notches 15 of the adjustable member 7.

Having thus described our invention, what we claim and desire to secure by Letters Patent is:

1. A locking device for a lever having a notched lever segment, comprising a body member and a stirrup telescoping with said body member, said stirrup having two legs and a yoke constructed to embrace the segment and coöperate with said body member to engage the segment, a tooth on one of said members constructed to engage the notches on the segment, said parts being adjustable to segments of different sizes, and means for locking said body member and said stirrup in an adjusted engaged position on said segment.

2. A locking device for a lever having a notched lever segment, comprising a body member and a stirrup member constructed to embrace and engage the segment, a tooth on each of said members extending crosswise of the segment when the device is in position thereon and constructed to engage either upper or lower notches on the segment, and means for locking said body member and said stirrup member in engaged position on the segment with one of said teeth engaging one of the notches on the segment.

3. A locking device for a lever having a notched lever segment, comprising a lock casing and a stirrup, said stirrup having its legs spaced to laterally engage and embrace the segment, and said stirrup and lock casing being adapted to hold the segment therebetween, a tooth on one of said first two members constructed to engage the teeth on the segment when the device is in position thereon, and means for locking said members in engaged position on the segment.

4. A locking device of the class described comprising a body member, a stirrup mounted in said body member and movable therein to different positions, a tooth on one of said members extending lengthwise of the yoke of said stirrup, and locking means constructed to lock said stirrup and said body member in different adjusted positions.

5. A locking device of the class described comprising a lock casing, a stirrup comprising two legs and a yoke and sliding in said casing, a tooth mounted on one of said first two members and positioned between the legs of said stirrup, and locking means in said casing.

6. A locking device of the class described comprising a lock casing, a stirrup comprising two legs and a yoke and sliding in said casing, a tooth mounted on said yoke, and locking means in said casing.

In testimony whereof we hereunto affix our signatures in the presence of two witnesses.

HAROLD B. ANDERSON.
PAUL ECKERT.

Witnesses:
C. H. SALISBURY,
B. B. BROCKWAY.